Sept. 27, 1932.  J. B. FREYSINGER  1,879,167

SAFETY SNAP HOOK

Filed July 9, 1931

Inventor
John B. Freysinger

By W. Clay Lindsey.
Attorney

Patented Sept. 27, 1932

1,879,167

UNITED STATES PATENT OFFICE

JOHN B. FREYSINGER, OF NEW BRITAIN, CONNECTICUT, ASSIGNOR TO NORTH & JUDD MANUFACTURING COMPANY, OF NEW BRITAIN, CONNECTICUT, A CORPORATION OF CONNECTICUT

SAFETY SNAP HOOK

Application filed July 9, 1931. Serial No. 549,661.

This invention relates to snap hooks of the type having a hooked member, a spring pressed pivoted tongue for closing the throat of the hooked member, and means for preventing accidental opening of the tongue. The snap hook of the present invention has general application, but is particularly adapted for use by linesmen, window washers, and operators of that sort where the element of safety is of prime importance.

An aim of the invention is to provide a snap hook of this sort having various features of novelty and advantage and which is particularly characterized by the surety with which the tongue is locked in place; the ease and facility with which the device may be operated, and the extreme simplicity of the arrangement.

More particularly, the invention contemplates a snap hook provided with a very simple catch by means of which the pivoted tongue is automatically and securely locked in closed position so that the hook cannot be accidentally opened, thus insuring against accidental separation of the hook from the ring, bale, or other member to which it is fastened. My improved arrangement comprises but a relatively few number of parts, each of which is of simple construction, and these parts may be very readily assembled. The catch may be very easily manipulated when it is desired to intentionally engage the hook with, or disengage it from, the ring or bale.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one embodiment which the present invention may take, Fig. 1 is an elevational view looking at one side of the device;

Figure 1:
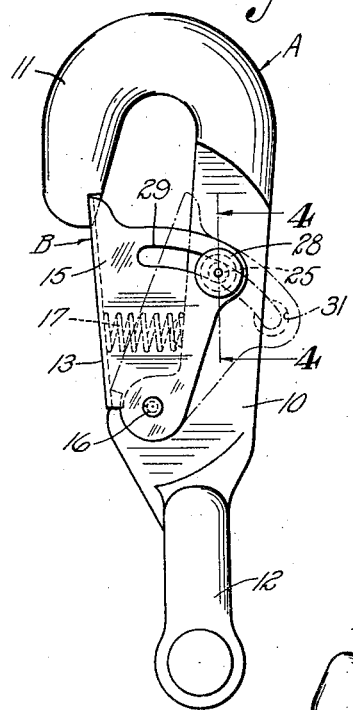

Referring to the drawing in detail, A designates a hook proper, which may be of any suitable construction but which is here shown as having a flat shank 10 provided at one end with a curved nose or bill 11, and at the other end with a loop, eye, or slide 12. The letter B designates a tongue which is here shown as being of an old construction, the same being preferably formed of sheet metal bent into U-shape so as to provide a front wall 13 and a pair of side cheeks or walls 14 and 15 which straddle the shank 10. The tongue is pivoted to the hook proper, as at 16, and it is normally urged into closed position by a spring 17 housed within the channel of the tongue and positioned between the front wall of the tongue and the forward edge of the shank 10. The construction so far described is an old and well known one, and is shown by way of illustration only.

Referring now to the improvements of the present invention, 25 designates a pin mounted for longitudinal sliding movement in an opening 26 extending transversely through the shank 10. On one end of this pin is a locking head 27 and on the other end is a button 28. The cheek 15 has, adjacent its free end, an arcuate slot 29 curved about the pivot 16 and of a width substantially equal to the diameter of the pin 25. The other cheek 14 has a similar slot 30 provided, at its forward end, with an enlarged circular portion 31 of substantially the same diameter as the locking head 27 so as to receive the same. The locking pin is normally urged into locking position by a spring 32 interposed between the cheek 15 and the push button or handle 38.

Figure 2:
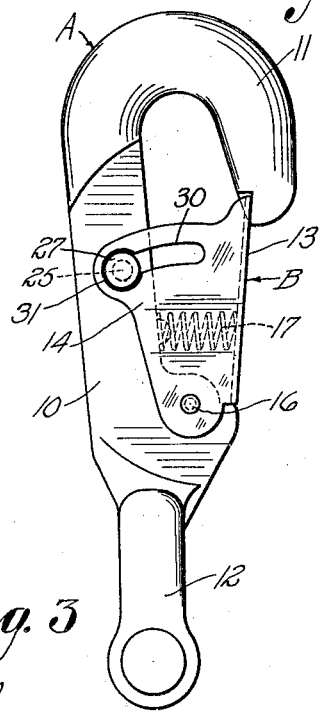
Fig. 2 is a like view of the other side of the device.
Figure 3:
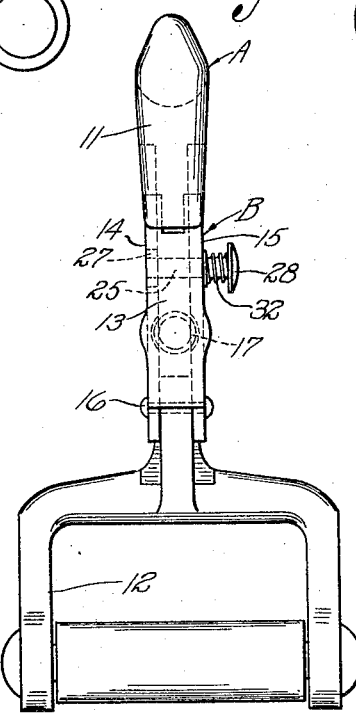
Fig. 3 is a front view thereof.
Figure 4:
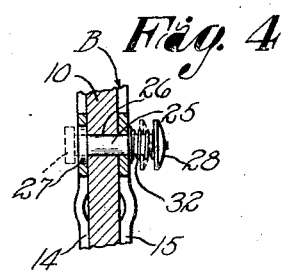
Fig. 4 is a sectional view taken on line 4—4 of Fig. 1.

The operation of the device will be clear from the foregoing description taken in connection with the following explanation. When it is desired to engage the hook with a ring, bale, or other element, the locking pin 25 is pushed in to the dotted line position shown in Fig. 4 to thereby disengage the locking head 27 from the enlarged end 31 of the slot 30. The tongue, when presssed against the ring, will move rearwardly to the dotted line position shown in Fig. 1 so that the ring may be moved through the throat of the hook proper. When the hook has been brought to a position where the tongue is free of the ring or bale, the tongue, under the influence of the spring 17, will move to the closed position shown by full lines in Figs. 1 and 2. The locking pin, having been released, will be automatically moved by the spring 32 to locking position, that is, to a position where the locking head 27 engages in the enlarged end 31 of the slot 30. The head 27 now prevents any possibility of the tongue being moved to open position, and thus accidental disengagement of the hook from the ring or other device to which it is secured is entirely guarded against. When it is desired to intentionally disengage the hook from the ring or other device, the pin 25 is again pushed in and pressure is applied to the forward wall of the tongue so as to move it to open position.

It will be observed that my improved locking means is very simple in construction and arrangement, comprising but a few number of parts each of which may be cheaply made. The parts may be readily assembled. The slots 29 and 30 in the tongue may be formed at the same time that the tongue is stamped out from the sheet of metal, and the only change which need be made in the hook proper is the drilling of the hole 26, an operation which may be cheaply carried out. The additional cost of the locking pin, the push button, and the spring associated with the locking pin is very small. In spite of the simplicity and cheapness of the arrangement, it is very effective in operation in that it may be very easily manipulated to attach and detach the hook, and it very securely locks the hook against accidental opening.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. A safety snap hook having a hook proper provided with a shank and a curved bill, a tongue pivoted to the hook proper and adapted to close the throat between the bill and the shank, said tongue having a cheek along one side of the shank and provided with a slot having an enlarged portion at one end, a locking pin slidably carried by said shank and having a head adapted to engage in the enlarged end of said slot, and a spring normally urging said locking pin in a direction to engage said head in the enlarged end of said slot.

2. A safety snap hook having a hook proper provided with a shank and a curved bill, a tongue pivoted to the hook proper and adapted to close the throat between the bill and the shank, said tongue having a cheek along one side of the shank and provided with a slot having an enlarged portion at its rear end, a locking pin slidably carried by said shank and having a head at one end adapted to engage in the enlarged end of said slot, and a spring normally urging said locking pin in a direction to engage said head in the enlarged end of said slot, said pin having a push button at its other end.

3. A safety snap hook having a hook proper provided with a shank and a bill, a tongue pivoted to the hook proper and adapted to close the throat between the bill and the shank, said tongue having a cheek along one side of the shank and provided with a slot having an enlarged portion at its rear end, said shank having a transverse opening in registry with said slot, a locking pin slidably fitting in said opening and having a head at one end adapted to engage in the enlarged portion of said slot when said tongue is closed, means on the other end of said pin for manipulating the same, and a spring about said pin and bearing against said manipulative means for normally urging said pin in a direction to engage the head thereof in the enlarged portion of said slot.

4. A safety snap hook having a hook proper provided with a shank and a bill, a tongue pivoted to the hook proper and adapted to close the throat between the bill and the shank, said tongue having a pair of cheeks straddling said shank and each provided with an arcuate slot struck about the pivot of said tongue, said slots being in registry and one of them having an enlarged portion at its rear end, said shank having an opening in registry with said slots, a locking pin having a stem slidably mounted in said opening and accommodated by said slots when the tongue is moved rearwardly, said pin having a head at one end adapted to engage in the enlarged end of said slot when the tongue is closed, a push button on the other end of said pin, and a spring behind said push button for normally urging said pin into locking position.

5. A safety snap hook having a throat, a tongue pivoted to said hook and adapted to close said throat, said tongue being provided with a slot having an enlarged portion at one end, a locking pin slidably carried by said hook and having a head adapted to engage in the enlarged end of the slot, and means for normally urging the head of said pin into engagement with the enlarged end of the slot.

JOHN B. FREYSINGER.